United States Patent [19]

Distin, Jr. et al.

[11] Patent Number: 4,552,037

[45] Date of Patent: Nov. 12, 1985

[54] RETAINER FOR EPICYCLIC TRANSMISSION

[75] Inventors: Robert G. Distin, Jr.; Thomas J. Lang, both of Louisville, Colo.

[73] Assignee: Advanced Energy Concepts '81 Ltd., Boulder, Colo.

[21] Appl. No.: 578,932

[22] Filed: Feb. 10, 1984

[51] Int. Cl.$^4$ .............................................. F16H 1/28
[52] U.S. Cl. ............................................ 74/805; 74/804
[58] Field of Search ................... 74/805, 804, 63, 202, 74/465, 801, 797

[56] References Cited

U.S. PATENT DOCUMENTS

| | | | |
|---|---|---|---|
| 1,767,866 | 6/1930 | Wildhaber | 74/804 |
| 1,831,577 | 11/1931 | Richer | 74/804 |
| 1,867,492 | 7/1932 | Braren | 74/804 |
| 4,023,440 | 5/1977 | Kennington et al. | 74/804 |

FOREIGN PATENT DOCUMENTS

| | | | |
|---|---|---|---|
| 1750279 | 3/1971 | Fed. Rep. of Germany | 74/804 |
| 991088 | 1/1983 | U.S.S.R. | 74/804 |

Primary Examiner—Leslie A. Braun
Assistant Examiner—Dwight G. Diehl
Attorney, Agent, or Firm—Sughrue, Mion, Zinn, Macpeak, and Seas

[57] ABSTRACT

A retainer for retaining and controlling a plurality of rollers rollingly engaging and transmitting torque between conjugate epitrochoidal-like and hypotrochoidal-like races has elongated slots formed therein which function to centrifugally load only those rollers located in a relatively stable position and not centrifugally load other rollers located in an inherently unstable position. Hence, smooth operation of the epicyclic speed reducing transmission is achieved.

13 Claims, 9 Drawing Figures

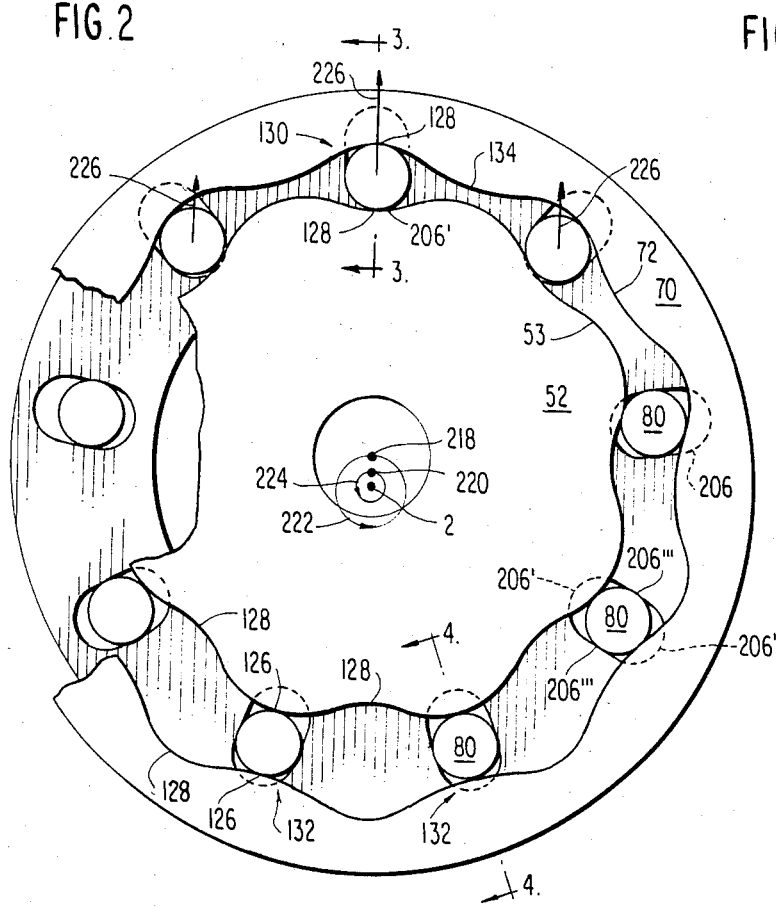
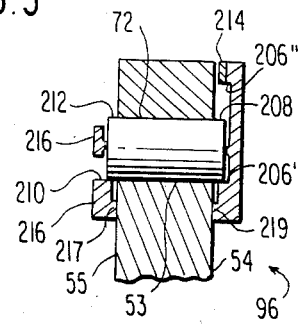
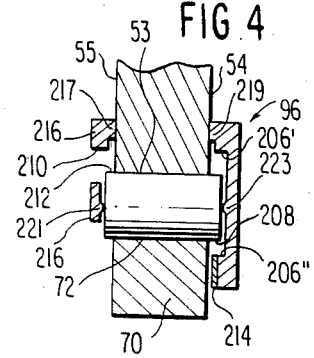
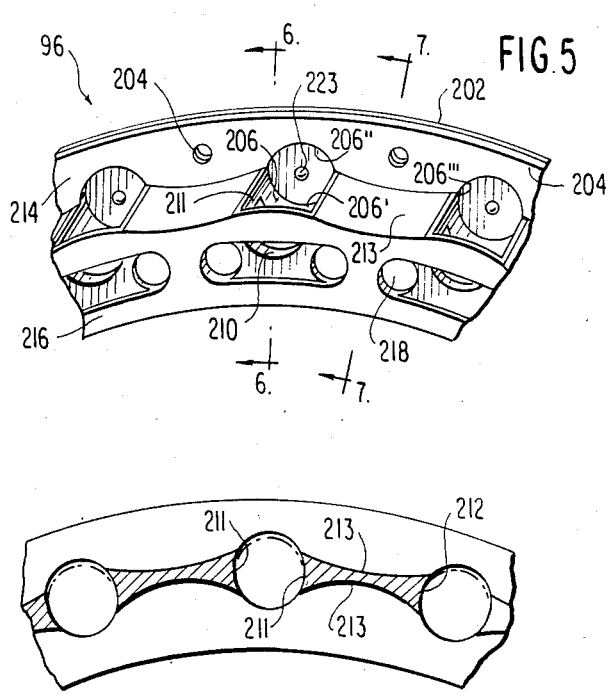
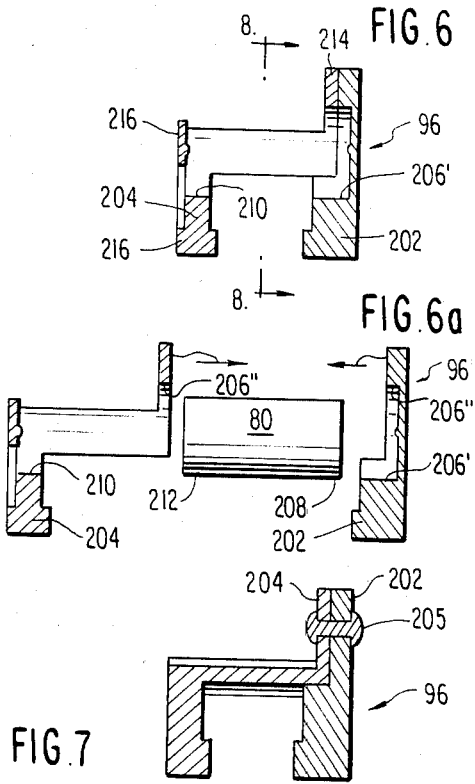

RETAINER FOR EPICYCLIC TRANSMISSION

CROSS-REFERENCE TO RELATED APPLICATIONS

The present application is related to U.S. Application Ser. Nos. 313,442 and 362,195, one of the present joint inventors being one of the co-inventors of each of these related applications. The disclosure of each of these related applications is hereby incorporated by reference.

BACKGROUND OF THE INVENTION

The present invention relates to a retainer for maintaining the cylindrical rollers in proper spaced relationship between an epitrochoidal-like shaped and a hypotrochoidal-like shaped conjugate set of races in an epicyclic speed reducing transmission of the kind described in U.S. Ser. No. 362,195, cited above Good positional control of rollers held between epitrochoidal-like shaped and hypotrochoidal-like shaped races in an epicyclic speed reducing transmission is essential to obtain optimum performance. Accordingly, it is important that the axial and radial positioning of the rollers be accurately controlled by a retainer as the epicyclic speed reducing transmission is operated. In addition, the structure of the retainer should not limit the design of the races so that the races can be designed to achieve optimum performance of the transmission.

It is also desirable that the retainer used for maintaining proper positional control of the cylindrical rollers be constructed to allow confronting lobes on the epitrochoidal-like shaped and the hypotrochoidal-like shaped races to nearly touch at the point of the closest approach. Such a lobe design of the races allows the cylindrical rollers to transfer maximum possible torque between the races. Accordingly, the retainer construction preferably should allow the use of relatively small, solid, rather than relatively large, hollow, cylindrical rollers so that the size of the cylindrical rollers can be minimized. Solid rollers are also more economical to produce than are hollow rollers. In addition, the retainer preferably should not contact any substantial part of the races.

SUMMARY OF THE INVENTION

Accordingly, an object of the present invention is to provide a retainer for maintaining cylindrical rollers in proper spaced relationship in an epicyclic speed reducing transmission which contains a set of conjugate epitrochoidal-like shaped and hypotrochoidal-like shaped races so that each of the cylindrical rollers is equally spaced from one another.

A further object of the present invention is to provide a retainer which allows the use of conventional solid rollers in such a transmission.

A yet further object is to provide a retainer which achieves accurate positional control of the rollers and provides excellent axial positioning of the rollers.

Another object is to provide a retainer which comprises a simple and economical, two-piece design which can be molded or cast from either plastic or metal material by utilizing relatively simple mold forming techniques.

A stiff further object of the present invention is to provide a retainer which allows confronting lobes of the conjugate set of races to nearly touch at the point of nearest approach so that maximum possible torque is transferred between the races by the cylindrical rollers.

These and other objects are achieved by a retainer which includes first and second retainer pieces having bearing surfaces on opposite axial ends thereof which selectively bearingly load solid rollers in a stable manner. On one axial end of the retainer, the bearing surfaces are formed in the shape of elongated circular slots, while on the other axial end of the retainer, the bearing surfaces are semicircular-shaped so as to extend radially outward from an axis of the transmission. The elongated slots are formed so that centrifugal forces generated by orbiting of the retainer are loaded onto only rollers having relatively stable positions by the bearing surfaces, and specifically those rollers closely entrained between confronting recesses of the conjugate races. On the other hand, the rollers which are closely entrained between confronting lobes of the conjugate races and are thus unstably positioned are not loaded by the bearing surfaces thus facilitating smooth operation of the transmission.

BRIEF DESCRIPTION OF THE DRAWINGS

FIG. 2 is a schematic view of a portion of the transmission shown in FIG. 1 illustrating how bearing surfaces of the retainer load rollers which are used for transmitting torque between a conjugate set of races;

FIGS. 3 and 4 are partial sectional views taken along lines 3—3 and 4—4, respectively, in FIG. 2;

FIG. 5 is a perspective view of one embodiment of a retainer constructed according to the present invention;

FIGS. 6 and 7 are cross-sectional views of the retainer taken along lines 6—6 and 7—7, respectively, in FIG. 5;

FIG. 6a is an exploded view of the retainer shown in FIG. 6 further illustrating a roller to be retained thereby; and FIG. 8 is a partial sectional view of the retainer illustrated in FIG. 6 taken along lines 8—8.

DESCRIPTION OF THE PREFERRED EMBODIMENTS

Figure 1:
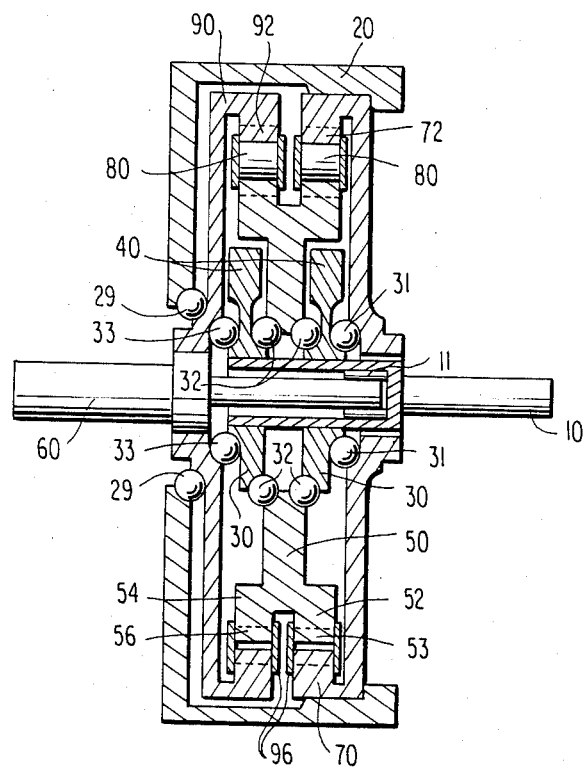
FIG. 1 is a sectional view of a two-stage, epicyclic speed reducing transmission for which a retainer constructed according to the present invention is to be used.

1. Description of Epicyclic Speed Reducing Transmission

FIG. 1 is a sectional view of one embodiment of an epicyclic speed reducing transmission disclosed in copending Application Ser. No. 362,195. The epicyclic speed reducing transmission shown in FIG. 1 utilizes first and second conjugate sets of races 72, 53 and 92, 56 for achieving first and second speed reductions, respectively, and each set of conjugate races has a plurality of cylindrical rollers 80 disposed therein for transmitting torque between respective first and second confronting surface regions 72, 53 and 92, 56 of each set of conjugate races. The shape of the first and second confronting surface regions 72, 53 of the first set of conjugate races utilized by the transmission of FIG. 1 is further described and illustrated in the Ser. No. 362,195 Application, cited above. Methods of making these races are described in the copending Application Ser. Nos. 313,442 and 362,195.

In FIG. 1, first gear means 70 is fixed to a stationary housing 20, and the first gear means 70 functions as a stator in operation. The first surface region 72 of the first gear means 70 is formed with a trochoidal-like curvature, and the first surface region confronts a second surface region 53 which is also formed with a trochoidal-like shaped curvature. The second surface region 53 is formed on a first gear element 52 of second gear means 50. The first and second confronting surface regions 72, 53 together comprise the first conjugate set of races.

The second gear means 50 is journalled on eccentric cams 30 formed on an input shaft 10 by means of a ring of bearings 32. The input shaft 10 is received in the housing 20 and is journalled for rotation therein by means of roller bearings 11 which separate the input shaft 10 from an extension of an output shaft 60. The eccentric cams 30 and the input shaft 10 are further supported against the housing 20 by further bearing elements 31 and against an output gear element 90 by bearing elements 33.

As the input shaft 10 is rotated, the second gear means 50 is made to undergo orbital motion by the eccentric cams 30, and a pair of counterweights 40 are provided on the input shaft 10 opposite the most highly eccentric portion of the cams 30 for balancing the transmission as the input shaft 10 is rotated. The orbiting speed of the second gear means 50 is proportional to the rotational speed of the input shaft 10. In addition, due to the presence of the bearings 32, the second gear means 50 is capable of rotating about its axis independently of the orbital motion imparted thereto by the input shaft 10 and the eccentric cams 30. As the cams 30 revolve one full rotation, a top dead center position of the cams also revolves one full rotation, as does the point of closet approach 134 (see FIG. 2) between the races 53, 72.

The cylindrical rollers 80 are maintained in spaced relationship between the first and second confronting surface regions 72, 53 of the first set of conjugate races by a retainer, generally indicated by reference numeral 96, and the cylindrical rollers 80 transmit torque between the stator race 72 and its conjugate race 53. The second gear means 50 is a generally disc-shaped element which is bifurcated at its radial outer periphery to form the first gear element 52 and a second gear element 54, and, as indicated, the race 53 is formed on the first gear element 52. The second gear element 54 also has an outer surface 56 formed with trochoidal-like shaped curvature which confronts a further trochoidal-like shaped surface 92 formed on the output gear element 90. The surfaces 56, 92 form the second set of conjugate races, and further cylindrical rollers 80 are maintained in spaced relationship by an additional retainer 96 between the surfaces 56, 92 so that the additional rollers 80 transmit torque between the surfaces 56, 92. The output gear element 90 is connected to the output shaft 60, and the bearing elements 29 support the output gear 90 against the housing 20.

As the input shaft 10 is rotated, the eccentric cams 30 cause the second gear means 50 to orbit, and the second gear means 50 is caused to rotate at a first speed reduction due to the roller engagement between the first and second confronting surface regions 72, 53. The output gear element 90 and its associated output shaft 60 are also caused to rotate at a second speed reduction due to the roller engagement between the second set of conjugate races 92, 56.

FIG. 2 schematically shows the first surface region 72 of the first gear means or stator 70 engaged with the second surface region 53 of the first gear element 52 of the second gear means 50 via the plurality of cylindrical rollers 80. As indicated, the first and second surface regions 72, 53 are conjugate, trochoidal-like shaped, with one of the surface regions being epitrochoidal-like shaped while the other surface region is hypotrochoidal-like shaped. In the embodiment shown in FIG. 2, the first surface region 72 of the stator 70 is hypotrochoidal-like shaped, while the second surface region 53 of the first gear element 52 is epitrochoidal-like shaped, though an opposite configuration is also possible.

It should be noted that the first and second surface regions 72, 53 are not shaped so as to form true trochoidal curves and, specifically, true epitrochoidal and hypotrochoidal curves, since these surfaces are formed so that the center axis of each of the cylindrical rollers 80 travels a true trochoidal curved path as the rollers 80 transmit torque between the first and second surface regions 72, 53. Since the cylindrical rollers 80 have a finite diameter, the first and second surface regions 72, 53 are necessarily spaced from the center axis of each of the cylindrical rollers and, accordingly, have a shape which necessarily deviates slightly from the true trochoidal path. However, the shapes of the surface regions 72, 53 approach that of a true trochoidal curve and, specifically, a true hypotrochoidal and epitrochoidal curve, respectively, as the radius of the cylindrical rollers 80 approaches zero.

Referring to FIG. 2, the hypotrochoidal-like shaped surface region 72 has two more lobes 126 and two more recesses 128, respectively, than does the epitrochoidal-like shaped surface region 53, and the number of rollers 80 disposed therebetween corresponds to the number of lobes of the hypotrochoidal-like surface region, less one.

The positioning of the respective lobes 126 and recesses 128 of each of the surface regions 72, 53 and the cylindrical rollers 80 range from a first position 130 where one of the rollers 80 is entrained within opposing recesses 128 to a second position 132 where another one of the rollers 80 is entrained between confronting lobes 126, with the first and second positions 130, 132 being at substantially diametrically opposite sides of the first gear means 70 and the first gear element 52.

As the inner gear member 52 orbits due to the rotational input from the input shaft 10 and the eccentric cams 30, assuming that the outer first gear means 70 is maintained stationary, the inner gear element 52 will be caused to rotate about its axis at a speed determined by the relative number of lobes on the first and second surface regions 72, 53 as the rollers circulate and rollingly engage both these surface regions. Specific formulae for determining the output speed ratio are set forth in the above-mentioned, copending Application Ser. No. 362,195.

The second set of conjugate races 92, 56 are shaped like the first set of conjugate races 72, 53 except that the number of lobes and recesses on the second set of races differs from the number of lobes and recesses on the first set of races so that a second, different speed reduction is attained by the roller engagement of the second gear element 54 and the output gear element 90.

2. Description of Retainer for Epicyclic Speed Reducing Transmission

As indicated above, good positional control of the rollers 80 is essential in the epicyclic speed reducing transmission to achieve desired optimum performance, and it is essential that the radial and the axial positions of the rollers be accurately controlled in operation.

FIGS. 3–8 show various cross-sectional and perspective views of a retainer constructed according to the teachings of the present invention, the retainer retaining and controlling the position of the rollers 80 as they rollingly transmit torque between the epi- and hypotrochoidal-like shaped surfaces 53, 72, respectively. The retainer comprises two pieces 202, 204 which are joined together by any suitable means such as rivets, welds, bolts, etc. with rivets 205 being illustrated in FIGS. 5 and 7. The rivets extend parallel to an axial direction of the transmission.

Elongated circular slot-shaped bearing surfaces 206 are formed on a first axial side of the retainer 96 at the side thereof where the pieces 202, 204 are joined. The slot-shaped bearing surfaces 206 accommodate first circumferential axial end surfaces 208 of the rollers 80. The amount of elongation of the elongated circular slot 206 has been greatly exaggerated in the Figures for ease of ilustration. Typically, the amount of elongation of the elongated circular slots would be that necessary to allow for thermal expansion, tolerances and other material properties, while maintaining position of rollers through range of operating temperatures. This distance corresponds to the total gap formed between the end surfaces 208 of the rollers 80 and radial innermost and outermost bearing surfaces 206' and 206" of the first bearing surfaces 206. Further, bearing surfaces 210 in the form of semicircular slots are formed on an opposite axial side of the retainer 96 for accommodating opposite circumferential axial end surfaces 212 of the rollers 80.

The slot-shaped bearing surfaces 206 are formed such that the radial innermost bearing surfaces 206' thereof selectively contact the end surfaces 208 of the rollers 80 on a circumferential portion thereof which faces a center axis 2 of the transmission while the radial outermost bearing surfaces 206" of the slot-shaped bearing surfaces 206 are always spaced apart from a circumferential portion of the end surfaces 208 which faces away from the center axis 2, as best illustrated in FIGS. 2–4. Accordingly, the radial innermost bearing surfaces 206' selectively load the rollers 80 while the radial outermost bearing surfaces 206" are prevented from loading any of the rollers. Similarly, the second bearing surfaces 210 are formed and positioned on the second retainer piece 204 so as to bearingly support the rollers 80 on an inner radial circumferential portion of the end surfaces 212 which faces the center axis 2 of the transmission.

The slot-shaped bearing surfaces 206 further include side bearing surfaces 206''' which innerconnect the radial innermost and outermost bearing surfaces 206', 200" thus forming the completed elongated circular slots 206. The side bearing surface 206''' serve to retain and control the rollers against movement along a direction essentially tangential to the transmission center axis 2. Further tangential control of the rollers 80 is achieved by tangential bearing surfaces 211 which extend along an axial direction of the retainer 96 and which innerconnect first and second radially extending flanges 214, 216 of the second retainer piece 204, as illustrated in FIG. 5. The tangential bearing surfaces 211 are specifically formed so as to prevent, or at least minimize, any contact between these surfaces and either of the conjugate set of races. It is preferable to form the surfaces 211 so that a point of closest approach 134 (see FIG. 2) of the races 53, 72, which point is always radially at or adjacent to a top dead center radial position of the eccentric cam 30, is minimized. Minimizing the point of closest approach 134 achieves maximum torque transfer between the races 53, 72, all other variables being equal. Contact between the races 53, 72 and the surfaces 211 can be prevented by minimizing the arc over which the tangential bearing surfaces 211 extend, and by innerconnecting adjacent surfaces 211 which support adjacent rollers 80 by concave-shaped surfaces 213, as illustrated in FIGS. 5 and 8. If the retainer 96 is made of a relatively soft material such as plastic, as compared with the material from which the races 53, 72 are formed, the tangential bearing surfaces 211 as well as the innerconnecting concave-shaped surfaces 213 can be formed so as to allow some contact with the races, this contact generally being confined to those tangential bearing surfaces 211 offset from a top dead center radial position of the eccentric cam 30 by an angle between 20° and 70° and between −20° and −70°. Preferably, the angular range should be maintained between 30° and 60° and between −30° and −60° so that the amount of contact can be kept relatively small.

FIG. 2 illustrates a state of the transmission wherein a top dead center position of the eccentric cam 30 is directed vertically upwards, and accordingly the center axis 218 of the epitrochoidal-like shaped race 53 which is orbited by the eccentric cam is at its uppermost position as is a center axis 200 of the retainer 96. As the eccentric cam revolves around the center axis 2 of the transmission through an angle of 360°, the center axes 218 and 220 of the epitrochoidal-like race 53 and the retainer 96 also revolve around the center axis 2 as illustrated by arrows 222, 224, respectively, in FIG. 2. Accordingly, the eccentric cam causes the race 53 and the retainer 96 to orbit. As a consequence, a centrifugal force is generated by the orbiting motion of the race 53 and the retainer 96 along a direction which extends radially away from the center axis 2 and which is perpendicular to an instantaneous direction of travel of the center axes 218, 220. Specifically, in the state illustrated in FIG. 2, the centrifugal force is directed vertically upward since the direction of travel of the center axes 218, 220 of the race 53 and the retainer 96 is horizontally directed to the left. Hence, the retainer is urged upward.

As previously explained, the slot-shaped bearing surfaces are formed so that radial innermost bearing surfaces 206' bear against a radial innermost cylindrical surface portion of the circumferential end surface 208 of the uppermost positioned roller 80, as best illustrated in FIG. 3, and hence the retainer 96, which is urged upward by the centrifugal force generated by inertia due to its orbiting motion, exerts a force on the rollers 80 in the direction of the arrows 226 in FIG. 2. In addition, the second bearing surfaces 210 also bear against the radial innermost cylindrical surface portion of the opposite end surfaces 212 of the uppermost positioned rollers 80, as illustrated in FIG. 3. Hence, the uppermost roller 80 closest at the top dead center position is loaded by the retainer and urged into a center position of the uppermost recess 128 of the hypotrochoidal-like race 72, which corresponds to the desired position for this roller. Therefore, positional stability of this roller is enhanced. Likewise, relative positional stability of the rollers 80 closest to the roller at the top dead center position is also enhanced since these latter rollers are also substantially entrained within recesses 128 of the race 72.

On the other hand, referring to the lowermost positioned rollers 80 shown in FIG. 2, which are located at or close to the bottom dead center position the radial outermost bearing surfaces 206" of the slot-shaped bearing surfaces 206 do not bear against these rollers due to the unique shape of the bearing surfaces 206, and specifically the elongation thereof, and hence to appreciable amount of the centrifugal force generated by the orbiting of the retainer 96 is loaded onto these rollers. This is a significant result since the rollers located at or adjacent the bottom dead center position of the eccentric cam (the lowermost rollers illustrated in FIG. 2) occupy unstable positions since they are rollingly engaged with the lobes 126, rather than in the recesses 128, of the hypotrochoidal-like race 72.

If the bearing surfaces 206 are formed so as to be circular, rather than elongated, the loading of the rollers by the retainer would be unpredictable and would vary, sometimes enhancing stability of the position of the rollers and sometimes enhancing the instability of the position of the rollers. Specifically, with circular retainer bearing surfaces, the rollers 80 located at or adjacent to the bottom dead center position of the eccentric cam would be just as likely as being loaded as the rollers at and adjacent to the top dead center position by the retainer 96, the amount of loading and distribution thereof between the rollers necessarily varying, which results in the rollers located at and adjacent to the bottom dead center position being sometimes loaded in an unstable manner. Such unstable loading results in the epicyclic transmission operating in a rough and relatively inefficient manner. However, since the retainer 96 of the present invention only permits significant loads on the rollers which are inherently stably positioned, the epicyclic transmission utilizing the retainer of the present invention runs smoother and more efficiently.

The above discussion has been directed to the loading imparted to the rollers 80 by the retainer 96 due to the slot-shaped bearing surfaces 206 located on one axial side of the retainer, specifically that axial side adjacent the flange 214. As FIGS. 3–6 readily illustrate, the second bearing surfaces 210 on the opposite axial side of the retainer 96 also only function to load those rollers which have inherently relatively stable positions and not the rollers which are inherently unstably positioned.

Therefore, as can readily be appreciated, as the eccentric cam 30 revolves around the longitudinal axis 2 of the epicyclic transmission, the various rollers 80 are loaded in turn by the retainer 96 as they approach the top dead center position of the eccentric cam whereat their positions are relatively stable, and the rollers are unloaded as they approach the bottom dead center position of the cam whereat their positions are relatively unstable.

In addition to the favorable centrifugal loading characteristics of the retainer achieved by the provision of the slot-shaped bearing surfaces, the elongation of these bearing surfaces 206, allow for greater tolerances in manufacturing the retainer. Specifically, since the bearing surfaces 206 are required to be elongated so as to have a major diameter which is longer than the diameter of the rollers by several thousandths of an inch, it is not required to precisely control the exact elongated length of the slots as is the case when utilizing circular bearing surfaces. Also, the use of greater tolerances is advantageous since the slotted bearing surfaces can readily accomodate a wider range of expansion and shrinkage caused by thermal expansion and contraction as the transmission is operated.

A further feature of the retainer is the provision of the plurality of holes 218 (see FIG. 5) formed in the flange 216 in the second retainer piece 204. The holes 218 allow lubricating fluid to enter into and exit from the spaces between the conjugate races, the volume of which is continuously changing in operation. Accordingly, hydraulic drag is minimized.

As FIGS. 3 and 4 readily illustrate, axial movement of the retainer 96 is restrained due to the close engagement between opposite side surfaces 54, 55 of the epitrochoidal-like shaped race 53 and axial side surface of the first and second retainer pieces 202, 204, respectively. Specifically, the flange 216 of the second retainer piece 204 has an axially extending raised surface 217 which closely abuts the side surface 55 of the race 53, and the first retainer piece 202 has a similar axially extending raised surface 219 which closely abuts the other side surface 54 of the race 53. The provision of the axially extending raised surfaces 217, 219 reduced frictional drag caused by end loading of the retainer 96. Of course it is also possible to form the retainer so that it closely abuts opposite side surfaces of the other race 72, or so that it closely abuts a first side surface of the race 72 and an opposite side surface of the race 53.

In addition, the flange 216 has a lobe 221 formed thereon in a position which contacts its respective roller 80 at a point on an axial end surface thereof along an axis of the respective roller, and a corresponding lobe 223 is formed on the first retainer piece 202 to contact an opposite axial end face of the rollers. The lobes 221, 223 function to minimize frictional drag between the axial end faces of the rollers and the flange 216 and the first retainer piece 202.

While this invention has been described in detail and with reference to specific embodiments thereof, it will be apparent to one skilled in the art that various changes and modifications can be made therein without departing from the spirit and scope thereof.

What is claimed is:

1. A retainer (96) for retaining and controlling a plurality of rollers (80) rollingly engaging and transmitting torque between conjugate epitrochoidal-like shaped and hypotrochoicallike shaped races (53, 72) in an epicyclic speed reducing transmission, wherein means (30) are provided for orbiting one of said races (53) and said retainer, said retainer generating a centrifugal force as it orbits, comprising:
a plurality of bearing surfaces (206', 210) which bearingly load a radial innermost cylindrical surface closest to an axis (2) of said transmission of all of said rollers which are located at and immediately adjacent to a top dead center position of said orbiting means with a portion of said centrifugal force and which maintain a radial outermost cylindrical surface furtherest from said axis of all of said rollers located at an immediately adjacent a bottom dead center position of said orbiting means unloaded from said centrifugal force.

2. The retainer as claimed in claim 1, wherein said rollers located at an immediately adjacent said top dead center position are closely entrained between confronting recessese (128) of said races, said rollers located at an immediately adjacent said bottom dead center position being closely entrained between confronting lobes (12) of said races.

3. The retainer as claimed in claim 2, further comprising first and second retainer pieces (202, 204); means (205) connecting said first and second retainer pieces together to rotatably support said plurality of rollers; said plurality of bearing surfaces including first bearing surfaces (206) facing radially outward from an axis (220) of said first retainer piece, said plurality of bearing surfaces further including second bearing surfaces (210) facing radially outward from an axis (220) of said second retainer piece, said first and second bearing surfaces being formed on opposite axial ends of said first and second connected retainer pieces.

4. The retainer as claimed in claim 3, wherein said first and second bearing surfaces each have a radius of curvature substantially corresponding to a radius of curvature of said innermost and outermost cylindrical surfaces of said respective rollers, said first and second bearing surfaces radially loading opposite cylindrical end surfaces (208, 212) of said respective rollers.

5. The retainer as claimed in claim 3, wherein said plurality of bearing surfaces further includes a plurality of elongated circular slot-shaped bearing surfaces (206), said first bearing surfaces being formed on radial innermost portions of said slot-shaped bearing surfaces, said slot-shaped bearing surfaces being elongated such that said first bearing surfaces contact all of said rollers located at and immediately adjacent said top dead center position of said orbiting means and prevents said first bearing surfaces from contacting and loading all of said rollers located at and immediately adjacent said bottom dead center position of said orbiting means.

6. The retainer as claimed in claim 5, further comprising third bearing surfaces (206", 211) bearingly retaining and containing radial side circumferential surfaces of said rollers, said radial side circumferential surfaces extending between and innerconnecting said radial innermost circumferential surfaces and radial outermost circumferential surfaces of said rollers, respectively.

7. The retainer as claimed in claim 6, wherein said third bearing surfaces further comprises tangential bearing surfaces (211) which extend along an entire axial length of said rollers and bearingly support said radial side circumferential surfaces of said rollers.

8. The retainer as claimed in claim 5, wherein said second retainer piece has holes (218) formed through a flange (216) thereon to allow lubricating fluid to flow into and out of a volume of space between said races to minimize hydraulic induced drag.

9. The retainer as claimed in claim 5, wherein said second retainer piece includes a flange (216) having a first axially extending raised surface (217) which closely confronts a first side surface (55) of either one of said races (53), said first retainer piece having a second axially extending raised surface (219) which closely confronts a second side surface (54) of either one of said races, said first and second axially extending raised surfaces restraining axial movement of said connected first and second retainer pieces.

10. The retainer as claimed in claim 9, wherein said first and second side surface of either one of said races and formed on only one of said races.

11. The retainer as claimed in claim 9, further comprising a plurality of lobes formed on said flange and said first retainer piece and positioned so as to lie substantially on respective axes of said respective rollers so as to contact opposite axial end faces thereof.

12. The retainer as claimed in claim 2, wherein said orbiting means comprises an eccentric cam.

13. The retainer as claimed in claim 2, wherein either one of said races is rotated by said rollers transmitting torque.

* * * * *